US012612491B2

(12) United States Patent
Polk et al.

(10) Patent No.: US 12,612,491 B2
(45) Date of Patent: Apr. 28, 2026

(54) HIGH MOLECULAR WEIGHT POLYAMIDES AND COPOLYAMIDES WITH UNIFORM RV AND LOW GEL CONTENT

(71) Applicant: Ascend Performance Materials Operations LLC, Houston, TX (US)

(72) Inventors: James E. Polk, Milton, FL (US); Chris E. Schwier, Boston, MA (US); Ashish Sen, Pensacola, FL (US); Craig A. Trask, Pensacola, FL (US); Cihan Uzunpinar, Chattanooga, TN (US); Chie-Hsiung Wang, Gulf Breeze, FL (US); J. Marty Zabcik, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

(21) Appl. No.: 18/135,132

(22) Filed: Apr. 15, 2023

(65) Prior Publication Data

US 2025/0215154 A1     Jul. 3, 2025

Related U.S. Application Data

(62) Division of application No. 15/778,778, filed as application No. PCT/US2016/063916 on Nov. 29, 2016, now abandoned.

(Continued)

(51) Int. Cl.
B29C 48/00          (2019.01)
B29B 9/12            (2006.01)
(Continued)

(52) U.S. Cl.
CPC ............... C08G 69/30 (2013.01); B29B 9/12 (2013.01); B29B 13/00 (2013.01); B29B 13/022 (2013.01);
(Continued)

(58) Field of Classification Search
None
See application file for complete search history.

(56) References Cited

U.S. PATENT DOCUMENTS 3,040,005 A     6/1962   Bernhardt et al.
3,042,005 A     7/1962   Gray
              (Continued)

FOREIGN PATENT DOCUMENTS

BE          875530 A      7/1979
CA          963594 A      2/1975
              (Continued)

OTHER PUBLICATIONS

Reeve (Mixers, Static, Thermopedia, Feb. 2, 2011, pp. 1-7; https://www.thermopedia.com/content/959/ accessed on Sep. 23, 2025) (Year: 2011).*

(Continued)

*Primary Examiner* — Rachel Kahn
(74) *Attorney, Agent, or Firm* — Womble Bond Dickinson (US) LLP

(57) ABSTRACT

A process of producing a polyamide polymer using in-line vacuum finishing technology in the absence of steam or other gases. The polyamide polymer, in particular Nylon 66, Nylon 6, and copolyamides, have a high molecular weight, excellent color, and low gel content. The polyamide polymer also has a relative viscosity greater than 50 as measured in a 90% strength formic acid solution; consistent viscosity with a standard deviation of less than 1; a gel content no greater than 50 ppm as measured by insolubles larger than 10 micron; and an optical defect content of less than 2,000 parts per million (ppm) as measured by optical control system (OCS). The polymer can be made into monofilaments or a multifilament yarn.

18 Claims, 4 Drawing Sheets

Related U.S. Application Data

(60) Provisional application No. 62/261,392, filed on Dec. 1, 2015.

(51) Int. Cl.

| | |
|---|---|
| *B29B 13/00* | (2006.01) |
| *B29B 13/02* | (2006.01) |
| *B29B 13/06* | (2006.01) |
| *B29C 48/04* | (2019.01) |
| *B29C 48/14* | (2019.01) |
| *B29C 48/25* | (2019.01) |
| *B29C 48/40* | (2019.01) |
| *B29K 77/00* | (2006.01) |
| *C08G 69/04* | (2006.01) |
| *C08G 69/06* | (2006.01) |
| *C08G 69/08* | (2006.01) |
| *C08G 69/28* | (2006.01) |
| *C08G 69/30* | (2006.01) |
| *C08G 69/36* | (2006.01) |
| *D01F 6/60* | (2006.01) |

(52) U.S. Cl.
CPC .............. *B29B 13/06* (2013.01); *B29C 48/00* (2019.02); *B29C 48/022* (2019.02); *B29C 48/144* (2019.02); *B29C 48/267* (2019.02); *B29C 48/40* (2019.02); *C08G 69/04* (2013.01); *C08G 69/06* (2013.01); *C08G 69/08* (2013.01); *C08G 69/28* (2013.01); *C08G 69/36* (2013.01); *D01F 6/60* (2013.01); *B29B 2013/005* (2013.01); *B29C 48/04* (2019.02); *B29C 2791/006* (2013.01); *B29K 2077/00* (2013.01)

(56) References Cited

U.S. PATENT DOCUMENTS

| | | | |
|---|---|---|---|
| 3,280,079 | A | 10/1966 | Brown |
| 3,343,363 | A | 9/1967 | Stow, Jr. et al. |
| 3,657,195 | A | 4/1972 | Doerfel et al. |
| 3,860,558 | A | 1/1975 | Klemchuk |
| 4,113,708 | A | 9/1978 | Chapman et al. |
| 4,180,495 | A | 12/1979 | Sandler |
| 4,591,468 | A | 5/1986 | Follows et al. |
| 4,760,129 | A | 7/1988 | Haering et al. |
| 4,775,579 | A | 10/1988 | Hagy et al. |
| 4,902,455 | A | 2/1990 | Wobbe |
| 4,939,237 | A | 7/1990 | Besso |
| 5,079,307 | A | 1/1992 | Taylor et al. |
| 5,102,594 | A | 4/1992 | Burlet et al. |
| 5,106,946 | A | 4/1992 | Clark, III et al. |
| 5,169,582 | A | 12/1992 | Illing |
| 5,262,099 | A | 11/1993 | Adams et al. |
| 5,504,185 | A | 4/1996 | Toki et al. |
| 5,543,495 | A | 8/1996 | Anolick et al. |
| 5,651,927 | A | 7/1997 | Auda et al. |
| 5,683,808 | A | 11/1997 | Adams et al. |
| 5,698,658 | A | 12/1997 | Dujari et al. |
| 5,707,733 | A | 1/1998 | Kurt et al. |
| 6,011,134 | A | 1/2000 | Marks et al. |
| 6,136,947 | A | 10/2000 | Wiltzer et al. |
| 6,169,162 | B1 | 1/2001 | Bush et al. |

| | | | |
|---|---|---|---|
| 6,187,877 | B1 | 2/2001 | Gotz et al. |
| 6,235,390 | B1 | 5/2001 | Schwinn et al. |
| 6,472,501 | B1 | 10/2002 | Fergusson et al. |
| 6,606,185 | B2 | 8/2003 | Saxe |
| 6,900,267 | B2 | 5/2005 | Royer et al. |
| 7,008,694 | B1 | 3/2006 | Frankel |
| 7,138,482 | B2 | 11/2006 | Tanaka et al. |
| 7,381,788 | B2 * | 6/2008 | Tsujii ..................... C08G 69/28 |
| | | | 528/480 |
| 8,211,340 | B2 | 7/2012 | Shen et al. |
| 8,759,475 | B2 | 6/2014 | Thierry et al. |
| 2002/0019471 | A1 | 2/2002 | Nozaki |
| 2009/0258226 | A1 | 10/2009 | Schwinn et al. |
| 2017/0114185 | A1 | 4/2017 | Okamoto et al. |

FOREIGN PATENT DOCUMENTS

| | | | |
|---|---|---|---|
| DE | 2158014 | A1 | 6/1972 |
| DE | 10118453 | C1 | 12/2002 |
| EP | 0295906 | B1 | 12/1992 |
| GB | 1095706 | A | 12/1967 |
| GB | 1202698 | | 8/1970 |
| GB | 1221123 | | 2/1971 |
| GB | 8725745 | | 12/1987 |
| JP | S5525408 | A | 2/1980 |
| JP | S5662123 | A | 5/1981 |
| JP | S57149463 | A | 9/1982 |
| JP | S6195026 | A | 5/1986 |
| JP | S6259653 | A | 3/1987 |
| JP | H01148856 | A | 6/1989 |
| JP | H02175762 | A | 7/1990 |
| JP | H0343417 | A | 2/1991 |
| JP | H0376756 | A | 4/1991 |
| JP | H048730 | A | 1/1992 |
| JP | H0413740 | A | 1/1992 |
| JP | H0493323 | A | 3/1992 |
| JP | HO9176324 | A | 7/1997 |
| JP | 2013189744 | A | 9/2013 |
| JP | 6290591 | B2 | 3/2018 |
| WO | 2015156363 | A1 | 10/2015 |

OTHER PUBLICATIONS

Jacobs et al., 12. Preparation of 6,6-Nylon and Related Polyamides, Polymerization Processes, C. E. Schildknecht and I. Skeist, eds. 1977, pp. 424-467, High Polymers, vol. XXIX. Wiley-Interscience, New York.

International Search Report dated Feb. 16, 2017 in PCT/US2016/063916.

Written Opinion dated Feb. 16, 2017 in PCT/US2016/063916.

International Preliminary Report on Patentability dated Feb. 13, 2018 in PCT/US2016/063916.

Japanese Office Action dated Jul. 1, 2020, with translation.

Extended European Search Report in counterpart EP patent application dated Aug. 7, 2019.

European Examination Report in counterpart EP patent application dated Jan. 26, 2023.

Chinese Office Action dated Jul. 22, 2020.

3M (Customer Application) Brief Filtration in Nylon 6,6 Manufacturing, 3M company, 70020186451 REV 1212b, 2012, pp. 1-4, https//www.centro-online.cm/files/3996424/uploaded/3m/CAB%20-%20Nylon%206.6%20Manufacturing%2070-0201-8545-1%20REV%%201212b.pdf. (Year 2012).

* cited by examiner

50 MICRONS

BRIGHTFIELD MICROSCOPY          BROKEN END

50 MICRONS

FLUORESCENT MICROSCOPY          BROKEN END

50 MICRONS

BRIGHTFIELD MICROSCOPY          BROKEN END

50 MICRONS

FLUORESCENT MICROSCOPY          BROKEN END

REACTIVE VACUUM EXTRUSION POLYMER PROCESS

| MEAN | 85.008 |
|---|---|
| StDev | 0.833 |
| VARIANCE | 0.693 |
| N | 109 |

SSP PROCESS

| MEAN | 85.266 |
|---|---|
| StDev | 1.428 |
| VARIANCE | 2.040 |
| N | 41 |

HIGH MOLECULAR WEIGHT POLYAMIDES AND COPOLYAMIDES WITH UNIFORM RV AND LOW GEL CONTENT

CLAIM FOR PRIORITY

This patent application is a divisional application based on copending U.S. patent application Ser. No. 15/778,778, filed May 24, 2018. U.S. patent application Ser. No. 15/778, 778 is a National Phase application of PCT/US2016/063916 filed 29 Nov. 2016 which was based on United States Provisional Application Ser. No. 62/261,392, filed 1 Dec. 2015. The priorities of the foregoing applications are hereby claimed and their disclosures incorporated herein by reference.

FIELD OF THE INVENTION

The present invention relates to customizable high molecular weight polyamides, including Nylon 66, Nylon 6, and copolyamides, and others having uniform RV and low gel content. The resultant polymer is suitable for various applications of fiber and film formation, in particular fiber spinning.

BACKGROUND

Traditionally, continuous polyamide production, in particular Nylon 6 (also referred to as N6 (poly caproamide) and Nylon 6,6, N66 or hexamethylene adapamide) polymerization processes involve an expansive and intensive multi-vessel infrastructure in order to achieve the final desired relative viscosity (RV). This is due to the necessity of boiling off large amounts of solution water along with the long hold up times required for the polymerization kinetics with currently practiced catalyzed and/or non-catalyzed systems.

An objective of the present invention is to be able to create customizable nylon 6 or nylon 66 polymer or copolymers having uniform RV and low gel content. A separate objective is to simplify the continuous N6 and N66 polymerization process by reducing the polymer residence time and thus polymer degradation. The resulting polymer is useful for making N6 or N66 polymer for the injection molding, film and fiber industries.

The present invention addresses the need for a low residence time process for the continuous production of polyamides, in particular, nylon polymer and products neat and compounded through the utilization of extruder and vacuum technology to simultaneously increase molecular weight (MW) and compound additives from a direct fed polymer melt stream.

DESCRIPTION OF THE RELATED ART

Numerous references describe polyamides and copolyamides, fibers and films formed from the materials and procedures for producing the polymers and articles. Following is a brief summary of related art.

U.S. Pat. No. 6,235,390, to Glenn Alan Schwinn et al., discloses polyamide filament with formic acid relative viscosity of at least 140 and tenacity in the range of 4.5 to 7 gpd for use in papermaking machine felts and other staple fiber applications. Although the patent discloses improved relative viscosity, the range of tenacity of the monofilament obtained indicates lower strength of the polyamide filament.

U.S. Pat. No. 8,211,340, to Swu-Chen Shen et al., discloses a process to produce a squared-analogous cross-section polyamide filament for uncoated airbag fabrics using melt extrusion technique. The polyamide filament obtained has a reported tenacity in the range of 7.5 to 9.5 g/denier and elongation of breakage of 18 to 30%.

U.S. Pat. No. 7,381,788 to Tsujii Yasuhito et al. discloses a method for continuous production of polyamide polymer having a relative viscosity with low standard deviation. This is also elaborated in Table 1 of the patent.

The patents to Yuo, i.e., U.S. Pat. Nos. 5,298,598, 5,298, 597, 5,298,594, 5,290,747, 5,264,541, 5,264,406, 5,260,246, each disclose a reactive extrusion process that includes polyamides and an alkali metal hypophosphite compound.

U.S. Pat. No. 6,900,267, to Royer, discloses a reactive extrusion process combining at least one polymer, oligomer, or combination thereof, and a carbon dioxide containing fluid in an extruder.

U.S. Pat. No. 5,651,927, to Auda, discloses an extruder whereby multiple sequential chemical reactions are carried out within multiple reaction zones.

U.S. Pat. No. 5,169,582, to Illing, discloses a method for making caprolactam by feeding the mass to an extruder provided at an increased temperature and vacuum to attain the desired degree of polymerization.

U.S. Pat. No. 5,102,594, to Burlet, discloses a process for making thermoplastic polymers using vented extruders.

U.S. Pat. No. 4,902,455, to Wobbe, discloses a method for degassing thermoplastic melts over a wide range of viscosities using a degassing extruder including a plurality of sequential degassing sections.

U.S. Pat. No. 3,657,195, to Doerfel, discloses a process for making high molecular weight nylon 6,6 by continuous further condensation of low molecular weight nylon 6,6 in a self-cleaning screw extruder reactor. The extruder includes at least one degassing orifice at elevated temperature and pressure.

U.S. Pat. No. 4,760,129, to Haering, discloses a process for preparing highly viscous polyhexamethyleneadipamide (nylon 6,6) using an extruder and injection of steam or gas having a residence time of 1-4 minutes.

U.S. Pat. No. 5,079,307, to Taylor et al., discloses a high molecular weight polyamide production from carboxy terminated polyamide prepolymers using a twin extruder and a catalyst as polymerization aid.

U.S. Pat. No. 5,543,495, to Anolick et al., discloses a process for increasing the molecular weight of polyamides and other condensation polymers, using a twin extruder under gas, with a catalyst, an activator, and a residence time of seconds to minutes.

U.S. Pat. No. 5,683,808, to Earl Blaine Adams et al., discloses a polyamide monofilament having a formic acid relative viscosity of at least 60, tenacity greater than 10 grams per denier (gpd), an along end standard deviation of tenacity of less than 0.1 gpd, and a hot air shrinkage at 177° C. of less than 15%. The polyamide monofilament is extruded by injecting low pressure steam or heated, which may contaminate the polyamide filament and further lower the overall tensile strength.

U.S. Pat. No. 5,707,733, to Max Kurt et al., discloses a nylon 6,6 monofilament with improved initial modulus, strength, LASE and wet relaxation as compared to standard polyamide (PA 66) monofilament. The patent also discloses that the nylon 6,6 monofilament has breaking extension of less than 25%. There continues to exist a need for a customizable polymer having desired properties (i.e., high molecular weight, high uniformity of molecular weight, low gel content) for particular end uses, as well as a process to produce a polyamide with greater efficiency than currently known in the art.

SUMMARY OF THE INVENTION

The present invention is directed to high molecular weight polyamides, with uniform viscosity substantially free of gels, wherein the relative viscosity (RV) ranges from about 50 or so to 200. The objective is to produce a customizable uniform polyamide polymer having minimal to substantially no gel content. The high molecular weight polymer, primarily nylon 6 and nylon 6,6 polymer and random copolymers thereof, substantially free of gels, preferably comprises a viscosity preferably greater than 50 RV, a uniform viscosity (RV) with a standard deviation of less than 1.0, a gel content as measured by insolubles larger than 10 micron less than 50 parts per million (ppm), and an optical defect content as measured by optical control systems (OCS) scanning technology of less than 2000 parts per million (ppm). The resulting polymer can be heat stabilized and formed into fibers (monofilament or multifilaments).

The polyamides of the invention have unexpectedly superior properties in terms of RV uniformity, gel content, optical appearance and fiber spinning performance as compared to existing products. Moreover, the inventive polymer when spun into fiber exhibits an unexpectedly low pack pressure rise, leading to greater pack life, for example greater than 10 days and preferably greater than 15 days. Applications for this polymer include converting to a monofilament or a multifilament fiber (yarn) having the following properties: tenacity greater than 9.0 grams per denier (g/d); elongation greater than 18%, and broken filaments less than 2 per 20 lbs bobbin.

Another aspect of the present invention is directed to the process of melt polymerization of polyamides, with a description of N66 to a high molecular weight polymer in the presence of an active phosphorous based polyamidation catalyst in a heated vented vacuum process extruder, in the absence of added steam or gas.

While the invention is described relative to polyamides, and in particular Nylon 66, Nylon 6, and copolyamides thereof, the invention can be applied to all polyamides ranging from aliphatic polyamides (traditionally N6 and N66 or other aliphatic nylons) to polyamides with aromatic components (for example, Paraphenylenediamine and terephthalic acid), to copolymers such as adipate with 2-methyl pentmethylene diamine and 3,5-diacarboxybenzenesulfonic acid (or sulfoisophthalic acid in the form of its sodium sulfonate salt).

It has not heretofore been seen in the art to have a process to produce a polymer having an adjustable precision RV with such high level of RV uniformity and low level of gel as described herein.

Generally, gel bodies are not visible to the eye in the polymer without an optical microscope. It is also necessary to have a method to enhance the contrast between the polymer and the gels, with use for example of a broad spectrum ultraviolet (UV) or near ultraviolet (UV) light for florescence excitation. U.S. Pat. No. 4,760,129 (1988, assigned to Werner & Pfleiderer) discloses production of highly viscous (RV equal or greater than 4) high molecular weight (Mn=34000, Mw=2.1) nylon 6,6 polymer using added superheated steam in the post polycondensation reaction. The data reports gels in terms of present or absent in the resultant polymer. There are no details provided on the measurement of gel or impurity content other than an assumed visual observance test. It is now known that for gels to be visible to the human eye, the gel content is incredibly high in the polymer. The minimum size an adult can discern is on the order of 30 microns or so. Therefore, while high molecular weight may have been achieved by the process of US'129, a low-gel polymer as defined herein is not suggested.

An advantage of the present invention is the potential low residence time (seconds versus minutes and hours) in the absence of added steam or gas in the post condensation phase, during which complete polymerization of the N66 is achieved starting from a pre-polymer or suitable material. The potential for a significant process simplification and the ability to quickly complete the partial and/or complete polyamidation of the N66 via reactive extrusion provides opportunities for numerous other process simplifications such as the ability to polymerize compounds and blend polymers continuously inline—i.e., in the same process step.

The removal of volatile components from the process by application of vacuum increases polymer quality and reduces the propensity for gelation and gassing in applications like molding, film, and fiber production. The process of the invention will also reduce the propensity for undesirable side reactions, such as crosslinking, since volatile organic compounds are absent and the process residence time is significantly reduced. The inventive process with the reduced residence time reduces gel formation in the resulting polymer.

Narrow residence time distribution along with "reduced or short" residence time are two separate concepts. While short residence time is discussed herein, narrow residence time is also applicable to the present invention. The distribution curve of a narrow residence time is narrowed (or tightened) and aids in the improvement of gel formation (or lack of gel formation). Specifically, it is the long tail of high residence times that leads to gel, and it is possible to have a long tail even if the average residence time is short. Twin screw extruders are well known to have a narrow residence time distribution due to the fact that it has all-wiped surfaces precluding any dead zones.

This inventive system is compact, simple, and does not require inventory of low RV material used to produce high RV material unlike a conventional SSP (Solid State Polymerization) process. Another advantage of this system is the vacuum component, which removes volatiles and other impurities that reduce the propensity of crosslinking and gel formation, thus increasing polymer quality. In addition, the present invention will result in improved performance in operations such as fiber spinning, molding, and film production in that the volatiles that react upon re-extrusion are not present and thus cannot react.

BRIEF DESCRIPTION OF DRAWINGS

The Figures illustrate potential applications of the present invention and represent exemplary embodiments and are not intended to limit the description of the present invention as otherwise described herein.

DETAILED DESCRIPTION OF EMBODIMENTS

Figure 1:
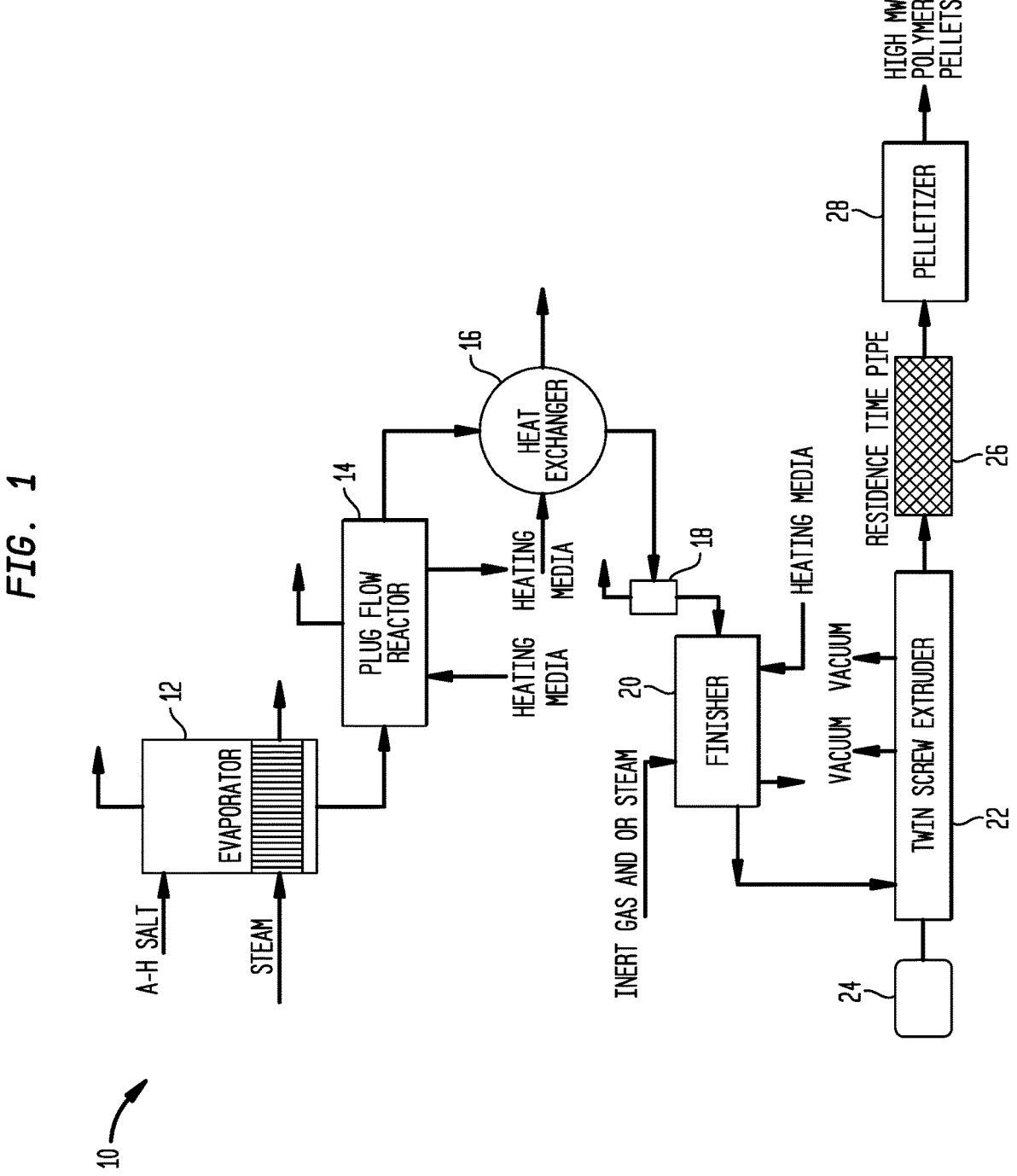
FIG. 1 illustrates an embodiment of a preferred polymerization system of the present invention with vacuum capability.

The invention is described in detail below in connection with the Figures for purposes of illustration, only. The invention is defined in the appended claims. Terminology used herein is given its ordinary meaning consistent with the definitions set forth below. Vacuum, for example, is expressed in mm Hg at 0° C.

As used in the specification and claims, the singular forms "a", "an" and "the" include plural references unless the context clearly dictates otherwise. For example, the term "an article" may include a plurality of articles unless the context clearly dictates otherwise.

"Consisting essentially of" and like terminology refers to the recited components and excludes other ingredients which would substantially change the basic and novel characteristics of the composition or article. Unless otherwise indicated or readily apparent, a composition or article consists essentially of the recited or listed components when the composition or article includes 90% or more by weight of the recited or listed components. That is, the terminology excludes more than 10% unrecited components. Any polymeric composition of the present invention may consist essentially of the recited components.

As used herein, "polyamides", "copolyamides" and like terminology refer to compositions containing polyamides. Exemplary polyamides and polyamide compositions are described in Kirk-Othmer, Encyclopedia of Chemical Technology, Vol. 18, pp. 328-371 (Wiley 1982), the disclosure of which is incorporated by reference. Briefly, polyamides are products that contain recurring amide groups as integral parts of the main polymer chains. Linear polyamides are of particular interest and may be formed from condensation of bifunctional monomers as is well known in the art. Polyamides are frequently referred to as nylons. Particular polymers and copolymers and their preparation are seen in the following patents: U.S. Pat. No. 4,760,129, entitled "Process for Preparing Highly Viscous Polyhexamethyleneadipamide", to Haering et al.; U.S. Pat. No. 5,504,185, entitled "Process for Production of Polyamides, Polyamides Produced by Said Process and Polyamide Film or Sheet", to Toki et al.; U.S. Pat. No. 5,543,495, entitled "Process for Increasing the Molecular Weight of Polyamides and Other Condensation Polymers", to Anolick et al.; U.S. Pat. No. 5,698,658, entitled "Linear Very High Molecular Weight Polyamides and Process for Producing Them", to Dujari et al.; U.S. Pat. No. 6,011,134, entitled "Method for Manufacturing Poly(Hexamethylene Adipamide) from Monomethyladipate and Hexamethylenediamine", to Marks et al.; U.S. Pat. No. 6,136,947, entitled "Process and Device for the Standardized Continuous Production of Polyamides", to Wiltzer et al.; U.S. Pat. No. 6,169,162, entitled "Continuous Polyamidation Process", to Bush et al.; "Polyamide Chain Extension Process and Related Polyamide Product", to Zahr, U.S. Pat. No. 7,138,482, entitled "Production Method of Polyamide", to Tanaka et al.; U.S. Pat. No. 7,381,788, entitled "Method for Continuous Production of Polyamide", to Tsujii et al.; and U.S. Pat. No. 8,759,475, entitled "Continuous Production of Polyamides", to Thierry et al.

Percents, parts per million (ppm) and the like refer to weight percent or parts by weight based on the weight of the composition unless otherwise indicated.

Process temperatures refer to extruder set points unless otherwise indicated.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Polymers of the current invention may be made into monofilaments or multifilaments. Polymers of the current invention may be made into blown films and cast films. The polymers can also be made or used as gel-free sheet extrusion for subsequent thermal forming and injection molded parts such as cable ties. Monofilaments may be used in 3D printing applications, ink applications, etc. These polymers are applicable to any application that requires excellent uniaxial or biaxial drawing technology and applications needing high strength fibers such as for use in industrial fabrics.

High Molecular Weight Nylon 6,6 Polymer

The high molecular weight polymer disclosed herein comprises a polyamide polymer with relative viscosity (RV) greater than 50, uniform viscosity with a standard deviation of typically less than 1, gel content less than 50 ppm, optical defects of less than (or no greater than) 2000 parts per million (ppm).

In particular, disclosed herein is a high molecular weight polyamide polymer, generally comprising a relative viscosity greater than 50 as measured in a 90% strength formic acid solution; consistent viscosity with a standard deviation of less than 1.0. a gel content less than 50 ppm as measured by insolubles larger than 10 micron; and preferably an optical defect level of less than 2,000 parts per million (ppm) as measured by optical scanning of pellets with an Optical Control System (OCS GMBH) analyzer. The resulting polymer may or may not be heat stabilized.

In any embodiment, the RV of the nylon 6,6 polymer may be greater than 50, 60, 70, 80, and 90. The RV is measured in 90% strength formic acid. In another embodiment, the uniform viscosity of the polymer standard deviation may be less than 1.2, 1.1, 1.0, 0.9. The polymer may include the gel content and the optical defect level less than 50 ppm and 2000 ppm, respectively. In an embodiment, the gel content and the contamination are preferably less than 50 ppm and 100 ppm, respectively. The gel content is measured by insolubles larger than 10 micron. The resulting fiber formed from the polymer has a low pack pressure rise pack life of greater than 15 days. In an embodiment, the resulting fiber formed from the polymer has a pack life of more than 10, 20, 30, and also more than 40 days.

The polymerization process optionally includes use of one or more polyamidation catalysts such as hypo-phosphorus acid and salts thereof. Specific examples include sodium hypophosphite, mono sodium phosphate (MSP), manganese hypophosphite, and benzene phosphinic acid (also called phenyl phosphinic acid or PPA).

The polymer may contain one or more additives such as fiberglass, waxes, minerals, carbon fiber, fiber reinforcement, heat stabilizers, color concentrates, impact modifiers, and flame-retardant additives. The polymer may also contain other commonly used additives which are known to people skilled in this art. Additives for Nylon 6 and Nylon 66 (depending on end use) may include Alkylenediamine and monocarboxylic acids or primary or secondary monoamines. Other additives and modifiers noted below may be used in connection with any embodiment of the present invention.

Canadian Pat. No. 963594 discloses heat-stable nylon 66 fibers with improved dyeability by adding sodium hypophosphite and diphenylamine into the nylon salt solution before polymerization reaction. U.S. Pat. No. 4,113,708 discloses a method using phenylphosphinic acid to reduce the formation of ammonia during the melt preparation of polyamide. Ger. Offen. DE 2158014 discloses a method to stabilize nylon 66 by adding alkali metal hypophosphite into amides and adipate before polymerization. Japanese Pat. Apps. JP 89-179,534 and JP 90-111015 disclose a method for the manufacturing of polyamides by first polymerizing diacids with diamine in the presence of a hypophosphite to give an oligomer then melt polymerizing the oligomer in the presence of a polyethylene wax. Great Britain Pat. App. GB 6648485 discloses a heat and light stabilizing additive for polyamide by adding sodium hypophosphite and phenols containing at least one hydrocarbon radical and a radical containing a COOH group or a derivative, to polyamide after or during polycondensation. In Japanese Pat. App. JP 89-212160, the polymerization additives contain manganese hypophosphite, hexamethylenediamine, and triazine compounds, which are added to reactants as fire retardants.

Hypophosphites have also been used as additives to modify the properties of polyamide and/or copolyamide after the completion of the polymerization reaction; a low-temperature antioxidant from a halogenated hydroxyl ammonium compound, hydrosulfide, bisulfite, phosphorus, and phosphate and a reducing agent from metal hypophosphite and ammonium hypophosphite. Ger. Offen. DE 3636023 discloses a granulated thermoplastics for hot-melt adhesives by mixing copolyamides with refined paraffin and sodium hypophosphite. Japanese Pat. App. JP 85-198900 discloses a polyamide resin composition by blending polyamides with modified polyolefin resins and metal salts of $H_3$ $PO_4$, $H_3$ $PO_3$ and $H_3$ $PO_2$. Japanese Pat. App. JP 81-34897 discloses a method for surface-sensitizing polyamide with sodium hydroxide and sodium hypophosphite. Japanese Pat. App. JP 78-97229 discloses using sodium hypophosphite as a heat stabilizer for copolyamide. Belg. BE 875530 discloses nonflammable polyester, polyamide and polyester-polyamide compositions by mixing polymers or copolymers with phosphinate salts. Japanese Pat. App. JP 90-208135 discloses a polyhexamethyleneadipamide with restricted three-dimensional structure. Copper acetate, potassium iodide or sodium hypophosphite is added to the final polymerized product as stabilizers. Japanese Pat. App. JP 90-116874 discloses mixing of sodium hypophosphite or calcium acid hypophosphite with polyamide, to prevent discolorization. Japanese Pat. App. JP 88-331806 discloses the use of hypophospherous acid or hypophosphite as anti-coloring agent for polyamide fillers. Japanese Pat. App. JP 88-273373 discloses an injection molded aliphatic polyamide container comprising a polyamide and additives selected from orthophosphorous acid, hypophosphorous acid, alkali metal salts and alkaline salts. Eur. Pat. App. EP 88-305493 discloses a method by which sodium hypophosphite and a cross-linking agent are added to a linear aliphatic polyamide to improve its melt viscosity.

It has been found that the stain resistance of certain polyamides can be improved by salt-blending the polyamide precursor with a cationic dye modifier, such as 5-sulfoisophthalic acid or salts or other derivatives; or copper iodide may be used to stabilize the polyamide for electrical/electronic and automotive molding applications.

While not necessarily needed for many embodiments of the present invention, chain extenders may be used if so desired. Suitable chain extender compounds include bis-N-acyl bislactam compounds, isophthaloyl bis-caprolactam (IBC), adipoyl bis-caprolactam (ABC), terphthaloyl bis-caprolactam (TBS), and mixtures thereof.

Further, the polymer is converted to filaments. The filaments have tenacity greater than 9.0 grams per denier (gpd) and elongation greater than 18%. In an embodiment, the tenacity of the filaments may be greater than 9.0, 9.5, 10, 10.5, 11, 11.5, and 12.0 gpd and the elongation of the filaments may be greater than 18, 19, 20, 21, 22, 23, 24, and 25%. The filaments drawn have broken filaments less than 2 per 16 pounds (lbs) bobbin. More preferred, the broken filaments drawn are less than 2 per 20 lbs, 2 per 22 lbs, 2 per 24 lbs, and 2 per 26 lbs bobbin. Further, the polymer is used in several applications such as fibers, air bags, and other industrial applications.

Process of Melt Polymerization

There are various routes or options to produce the high molecular weight polyamides of the invention with low RV standard deviation and substantially free of gels and optical defects. Typically, variations in the in-line process of the invention such as temperature requirements, types of extruders, modifiers, vacuum elements, etc., and operation thereof are within the knowledge of a skilled person. There are multiple methods for making the desired polymer. The teachings herein represent the production of a customizable polyamide polymer having the desired RV with little to no gel content or fines present, low optical defects and also the ability to make resulting fibers and yarns of high yield and high tenacity.

Generally speaking, known processes for production of polyamides is to make a low molecular weight polymer and then increase the molecular weight by various means, typically involving high temperatures and relatively long residence times. Low molecular weight products are made by batch (autoclave) processes (Ref: Big Chemical Encyclopedia, V19, [c.272]). D. B. Jacobs and J. Zimmerman, in C. E. Schildknecht and I. Skeist, eds. Polymerisation Processes, High Polymers, Vol. XXIX. Wiley-Interscience, New York, 1977, pp. 424, 467. A very detailed review of nylon-6,6 polymerization. [c.277], or continuous processes (reference: U.S. Pat. No. 6,472,501). This low molecular weight polymer is then fed to a solid state polymerization process which builds the molecular weight to the desired high level. (see FIG. 2).

In order to produce the products of the present invention, a low molecular weight polymer may be made via a batch autoclave process and subsequently processed via solid state polymerization (SSP) to high molecular weight. Autoclave processes are known to yield polyamides with relatively low gel content, but the batch process is prone to high variability in RV. To compensate for the inherent RV variability in the batch autoclave process, one needs to select a portion of the autoclave batch that would have a narrower RV variation, discarding a large portion of material prior to SSP processing, providing a relatively expensive and effort intensive procedure.

One alternative is to make a low molecular weight polymer via a continuous polymerization process and subsequently processing the polymer via SSP to high molecular weight. Continuous processes are known to yield very uniform RV, but conventional continuous processes are prone to high gel content due to inherent dead zones and non-uniform residence time leading to polymer degradation and gelation. To compensate for the inherent gel production in the continuous polymerization process, one may need to inspect every pellet of product for gels and to remove them. Optical/pneumatic automated processing may be employed; however here again providing a relatively expensive and effort intensive procedure which is prone to variability in product quality.

A third option (Option 3) is the inventive process described in detail herein involving vacuum finishing technology at relatively short residence times, which does not require substantial inventory as do the procedures discussed immediately above.

Option 3 is a process for producing a high molecular weight polyamide polymer by vacuum finishing technology. The vacuum finishing removes volatile components and allows for a resulting high molecular weight polymer to be produced that is substantially gel free. The absence of volatile materials and gels makes a more pure polymer especially well-suited for the production of molded parts, fibers, and films. The lower level of volatiles also reduces gassing and voids in the fiber filaments, molded parts and films, thus resulting in products with superior physical properties and productivity. The absence of gels will also improve spin pack life due to less contaminants, molded part and film defects, and productivity. The inventive process occurs in the absence of added or injected steam or gas during the second part of the reactor or polymerization process (reactive extrusion under vacuum in a twin screw extruder). The input temperature for the initial polymer feed is approximately 285° C. rising to a maximum of about 350° C., preferably less than 310° C., and most preferably less than 290° C., at the exit point of an extruder. The residence time for the polymer held in the extruder is less than 60 seconds, more preferably less than 30 seconds and even more preferably less than 20 seconds. The vacuum for the process is about 26-28 inches mercury, and a catalyst (e.g. PPA (phenyl phosphoric acid)) can be used if desired. It has been found that the reaction steam or vapor is removed from the extruder within about thirty (30) seconds. The polymer leaving the extruder can optionally be fed to a pipe for additional reaction, designated as the Residence Time Block (RTB), sometimes referred to herein as a residence time dwell vessel. The RTB is optionally provided with tube inserts to ensure a uniform residence time distribution and uniform melt temperature. A tube insert may be a static mixer insert; Various configurations and types of tube inserts are commercially available from Koch Heat Transfer Company and their use is discussed in Chemical Engineering Process, September 2012, pages 19-25; Shilling, Richard, L. The residence time in the RTB can vary from 30 second to 5 minutes and up to 10 minutes. The melt temperature can be from 290° C. preferably and could be up to a maximum of 350° C.

In a preferred process of the present invention, the combination of heat and mechanics (the movement of polymer through the extruder) remove the water produced in the polymerization reaction. However, it is an object to minimize the water formation by (unlike prior art) not injecting additional steam into the reaction at the post condensation stage. Steam is added at the initial polymerization step. It has been found that the reaction proceeds without the additional steam typically disclosed in the prior art. This is turn leads to greater efficiency of the equipment and more continuous operations since the ports are less likely to become clogged or plugged. While U.S. Pat. No. 5,543,495 (1996 patent, assigned to DuPont) discloses production of high molecular weight Nylon 6,6, it does so with the use of added steam and catalyst throughout the process. The RV of the product was shown to increase, however there was no discussion regarding gel or impurity formation.

The present invention is better understood by reference to the following test methods, additional definitions, attached Figures and following examples.

Test Methods

The mechanical and chemical properties of the polymer and the drawn filaments were measured using the following test methods:

Relative viscosity (RV) of nylons refers to the ratio of solution or solvent viscosities measured in a capillary viscometer at 25° C. (ASTM D 789). The solvent is formic acid containing 10% by weight water and 90% by weight formic acid. The solution is 8.4% by weight polymer dissolved in the solvent. The relative viscosity, $(\eta_r)$, is the ratio of the absolute viscosity of the polymer solution to that of the formic acid:

$$\eta_r = (\eta_p/\eta_f) = (f_r \times d_p \times t_p)/\eta_f$$

where: $d_p$=density of formic acid-polymer solution at 25° C., $t_p$=average efflux time for formic acid-polymer solution, s $\eta_r$=absolute viscosity of formic acid, kPa×s(E+6 cP)

$f_r$=viscometer tube factor, mm²/s (cSt)/s=$\eta_r/t_3$

A typical calculation for a 50 RV specimen:

$$\eta_r = (f_r \times d_p \times t_p)/\eta_f$$

where $f_r$=viscometer tube factor, typically 0.485675 cSt/s $d_p$=density of the polymer-formic solution, typically 1.1900 g/ml $t_p$=average efflux time for polymer-formic solution, typically 135.00 s $\eta_r$=absolute viscosity of formic acid, typically 1.56 cP giving an RV of $$\eta_r = (0.485675 \ cSt/s \times 1.1900 \ g/ml \times 135.00 \ s)/1.56 \ cP = 50.0$$

The term $t_3$ is the efflux time of the S-3 calibration oil used in the determination of the absolute viscosity of the formic acid as required in ASTM D789.

The Table below compares the ASTM D789 RV test method with other standard viscosity measurements.

| ASTM D789 Formic Acid (90%) | JIS K 6920-2 Sulfuric Acid (98%) | ISO 307 Sulfuric Acid (95.7%) |
|---|---|---|
| 40 | 2.5 | 2.4 |
| 45 | 2.7 | 2.5 |
| 50 | 2.8 | 2.7 |
| 55 | 2.9 | 2.8 |
| 60 | 3.0 | 2.9 |

-continued

| ASTM D789 Formic Acid (90%) | JIS K 6920-2 Sulfuric Acid (98%) | ISO 307 Sulfuric Acid (95.7%) |
|---|---|---|
| 65 | 3.1 | 3.0 |
| 70 | 3.2 | 3.1 |
| 75 | 3.3 | 3.1 |
| 80 | 3.4 | 3.2 |
| 85 | 3.5 | 3.3 |

Conversion chart for relative viscosity test methods: Relative Viscosity

Standard Deviation and RV Standard Deviation

The products of the invention are characterized by a precision Relative Viscosity greater than 50 as measured in a 90% strength formic acid solution as noted above, wherein the precision Relative Viscosity has an RV Standard Deviation of less than or equal to 1.25. The RV Standard Deviation of a material is the standard deviation in Relative Viscosity of a material taken on at least 15 randomly selected samples of that material. Preferably, the randomly selected samples are randomly selected from a quantity of 5 lbs or more of well mixed product. Still more preferably, at least 25 samples are selected and analyzed from a well-mixed quantity of 10 lbs or more of product.

The standard deviation of a sample is defined as follows:

$$s_N = \sqrt{\frac{1}{N}\sum_{i=1}^{N}(x_i - \overline{x})^2},$$

where $\{x_1, x_2, \ldots, x_N\}$ are the observed values of the sample items and x is the mean value of these observations, while the denominator N stands for the size of the sample: this is the square root of the sample variance, which is the average of the squared deviations about the sample mean.

Denier (ASTM D 1577) is the linear density of a fiber as expressed as weight in grams of 9000 meters of fiber. The monofilament is conditioned at 55±2% relative humidity, and 75°±2° F. on the bobbin for 24 hours when the mono-filament has aged more than ten days since being made. A 0.9 meter sample of monofilament is weighed and denier is calculated as the weight of a 9000 meter sample in grams. Denier times (10/9) is equal to decitex (dtex). Denier, and tenacity tests performed on samples of staple fibers are at standard temperature and relative humidity conditions pre-scribed by ASTM methodology. Specifically, standard con-ditions mean a temperature of 70+/−2° F. (21+/−1° C.) and relative humidity of 65%+/−2%.

Tensile Properties such as tenacity, breaking strength and elongation of the monofilament or multi filament were determined in accordance with ASTM D 885M. Before tensile testing of-spun monofilaments, the monofilament is conditioned on the package (bobbin) for a minimum speci-fied period at 55±2% relative humidity and 75°±2° F. This period is (unless otherwise specified) is 24 hours when the filament has aged more than ten days since spinning. Sample is air stripped prior to testing. A recording is used to characterize the stress/stain behavior of the conditioned monofilament. Samples are gripped in air-activated clamps maintained at least 40 psi pressure. Samples are elongated to break while continuously recording monofilament stress as a function of strain. Initial gauge length is 10 inches (25.4 cm), and cross head speed is maintained at a constant 6 inches (15.3 cm)/minute. Those of skill in the art will appreciate that while the polymeric invention is may be primarily for use in monofilaments, multifilaments can be made from the customizable polymers. Breaking strength is recorded as the maximum load in pounds or kilogram force and elongation is logged as the strain in percentage prior to rupture of the sample. Tenacity is calculated from the break strength divided by the denier (after correcting for any adhesive on the filament) and is expressed as grams per denier (gf/d).

Insoluble Material Test and Gel Content Parameter

The Insoluble Material Test is carried out wherein a representative sample the product polymer (preferably at least 50 grams) is dissolved in an appropriate solvent, in this case 90% formic acid at 25° C. and processed as follows. The resulting polymer-formic acid solution is filtered (EMD Millipore 47 mm diameter type AN1H04700 polypropylene filter with a 10 micron pore size) and then the filter washed with fresh formic acid solution at 25° C. to remove any remaining polymer. A further washing with reagent grade methanol is performed and the filter and material remaining thereon are then dried to a constant weight. The difference in the post-filtration weight and the tare weight of the filter prior to use is taken to be the mass of insoluble material in the product. Concentrations and sample size utilized are selected to allow one to obtain an amount of insoluble material that can be weighed with precision. Insoluble materials may include gels, environmental contaminants, metals, degraded additives, and other process and non-process related contamination. Since it is found that the insolubles correlate closely in most cases with gel content, the results are expressed as a Gel Content Parameter in 90% formic acid at 25° C. as is seen in the following example calculation. Typical procedure/sample calculations:

88.0 grams of resin is dissolved in 800 mL of 90% formic acid 10% water at 25° C. and vacuum filtered.

Filter starting weight is 85.000 milligrams.

After rinsing with clean formic and methanol and drying to constant weight the filter with gels weighs 86.375 mg.

$$(86.375 - 85.000)/1000 \text{ mg/g})/88.0) \times 1E6 =$$

15.6 *ppm* insolubles or a Gel Content Parameter of 15.6 *ppm*.

Optical Control System (OCS) Measurements and Average Optical Defect Level

Optical defects are measured by way of a vendor supplied test based on the equipment employed (Optical Control Systems GmbH, model PS-25 C). The unit utilizes a high-speed CCD camera, with a focusing/magnification lens, recording at 30 frames per second (fps). The camera reso-lution is 63 micrometers (µm) per pixel. The camera is placed at a 90 degree angle perpendicular above the sample transport system. This transport system utilizes a vibrating platform to transport the sample past the camera field-of-view at a constant rate. This platform, being of a pure white material, also serves as the background for the analysis. Typical sample size is 0.5 to 5 kilograms (kg) of 2.5-3 mm cylindrical pellets. Placed between the sample field-of-view and the camera is an annular light source emitting visible light typically between 400 and 700 nanometers (nm). The light source can be a fluorescent type ring bulb or an array of light emitting diodes (LEDs). The camera images the sample field-of-view through a ring-shaped opening in the light source. As the sample is transported through the field-of-view, the camera system records the reflected visible image. This software also characterizes these defects based on color (up to five different categories) and size of the defects. The defect sizes are categorized into as many as 10 different categories from 63 μm up to the maximum size selected. The apparent diameter is calculated from which a defect volume can be derived. The system expresses the Average Optical Defect Level in ppm (assuming constant density) based on defects in a size range of from 25 microns to 5 mm. The analysis detects gels, black specks, fish eyes, holes, and wrinkles, scratches, coating voids, water drops, oil stains, insects, die lines, contaminations and bubbles. This method of determining defect levels is specified generally for films instead of pellets in ASTM 7310, but is otherwise substantially the same.

Referring to FIG. 1, there is shown a preferred apparatus 10 for producing the polyamide products of the present invention. Apparatus 10 includes an evaporator 12, a plug flow reactor 14, provided with a decompressor/flasher, a heat exchanger 16, a phase separator 18, a finishing vessel 20, a twin screw extruder 22 provided with a motor 24, a residence time block or residence time dwell vessel 26, as well as a pelletizer 28.

In operation, a nylon salt solution is fed to evaporator 12 where the solution is concentrated and fed with catalyst to plug flow reactor 14 where the nylon is polymerized to an RV of about 3-20. The polymer is decompressed and maintained in the melt and heated with of heat exchanger 16 before being fed to phase separator 18 where volatiles are removed as shown.

From the phase separator, the low molecular weight nylon is fed to finishing vessel 20 where moisture is removed and the nylon further polymerized to an RV of about 30-45. In vessel 20, the polymer melt is blanketed with an inert gas and/or steam. After vessel 20, the melt, preferably including catalyst, is fed to twin screw extruder 22 driven by motor 24. The twin screw extruder is operated under high vacuum to remove moisture and other volatiles, typically over 600 mm Hg vacuum, and the low molecular weight nylon is further polymerized thereon for a relatively short residence time in the extruder; typically, less than 1 minute, in order to raise the RV of the polymer melt to more than 50, possibly or suitably above 75 or so. The twin screw extruder is typically operated at a barrel set point temperature between 275 or 285-350° C. Preferably closer to 285° C. is preferred such as from 280-290° C. Higher molecular weights, such as an RV of 75 or more are achieved with higher extruder temperatures such as above 300° C. or so. Optionally, the extruder is operated below 300° C. and the polymer melt is fed to residence time dwell vessel 26 where the material further polymerizes before being fed to a pelletizer 28, such that an RV of 75 or more can be achieved utilizing a melt temperature of below 300° C.

Polyamides with a precision RV of 80 and above and low gel content are readily prepared in apparatus 10 as is seen in the Examples which follow.

Figure 2:
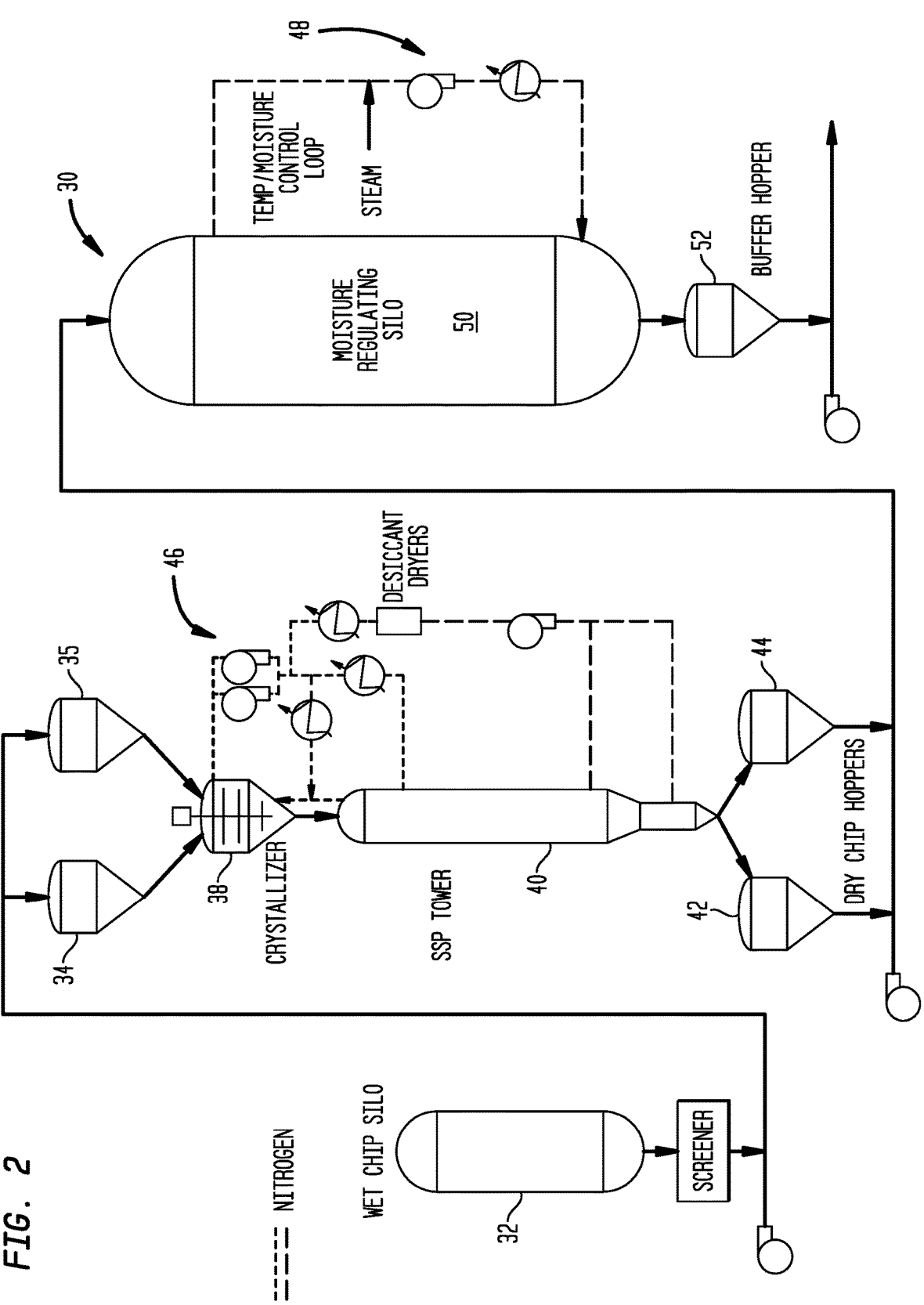
FIG. 2 illustrates a conventional high molecular weight solid state finishing process with high inventory.

The inventive apparatus 10 is an alternative to an SSP process which requires a large inventory of material as is appreciated from FIG. 2.

In FIG. 2 there is shown an SSP apparatus 30, including a wet chip silo 32, feed hoppers 34, 35 and a crystallizer 38. Further provided is an SSP tower 40, as well as product hoppers 42, 44, heat and moisture regulators indicated at 46, 48, as well as a moisture regulating silo 50 and a buffer hopper 52.

In operation, polymer chip prepared by a commercialized process having an RV value of 35-45 or so is fed to SSP tower 40 and held at a temperature of from 150° C. to 190° C. for a residence time of 1-48 hours to increase molecular weight. Despite the added expense in terms of equipment and inventory, the SSP process described above produces a polyamide with a higher RV Standard Deviation than apparatus 10 described above. Gel Content Parameters and Optical Defect Levels are also difficult to control, depending upon the quality of the low molecular weight material fed to the SSP tower and the degree of control exercised over the SSP process.

Figures 3A, 3B, 3C, 3D:
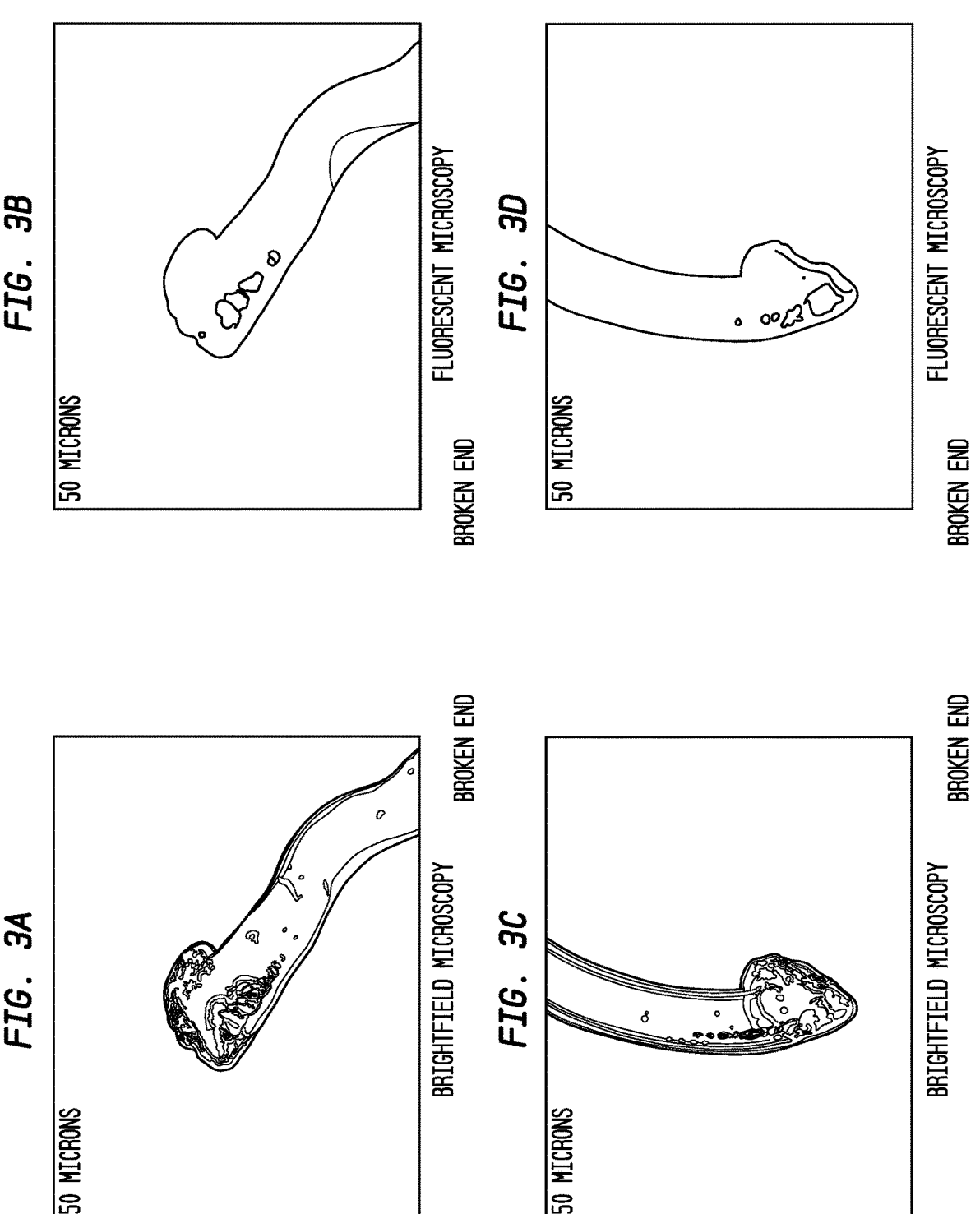
FIGS. 3A-3D illustrate gel bodies associated with filament breaks in Nylon 66 fiber.

Product quality is reflected, in part, by the Gel Content Parameter which is correlates to insolubles in the product and may relate to the appearance and fiber-forming characteristics of the product depending on gel size and gel levels on a volumetric basis. Gels are believed to generate largely by way of thermal degradation of polymer, catalyst and additives in the system. Without being bound by any particular theory, it is believed gelation is a function of time and temperature. The photomicrographs of FIG. 3 are line drawings of bright field and fluorescent photomicrographs respectively of first (FIGS. 3A, 3B) and second (3C, 3D) filament breaks observed during fiber manufacture from Nylon 6,6. The breaks had gel material as evidenced by the fluorescence and that they were insoluble in formic acid. The observed gel bodies were in a size range of about 18 microns and less. It is seen from FIG. 3 that the gel bodies are often associated with breaks during high-speed manufacture and are a likely cause of many breaks.

Figure 4:
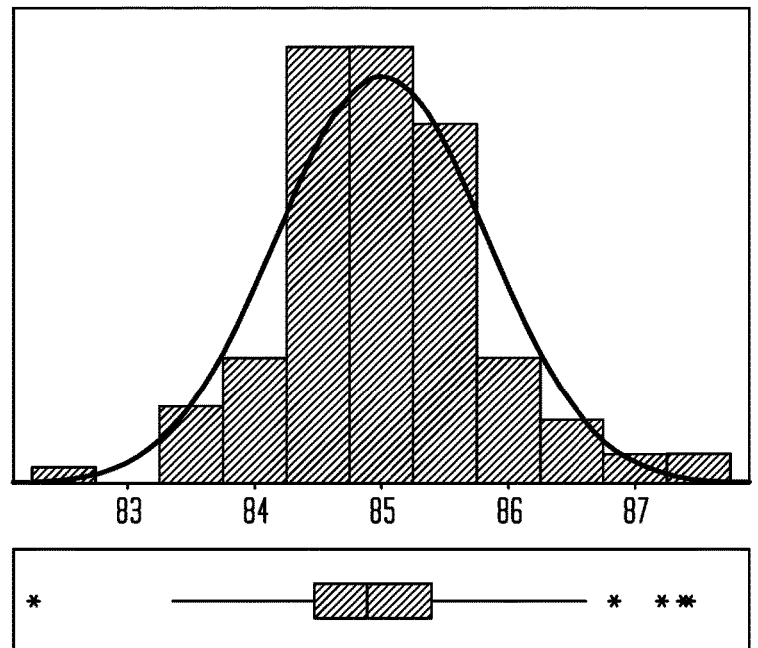
FIG. 4 is a histogram illustrating an RV distribution of a polymer having a nominal RV of 85 made by a preferred process of the present invention.
Figure 5:
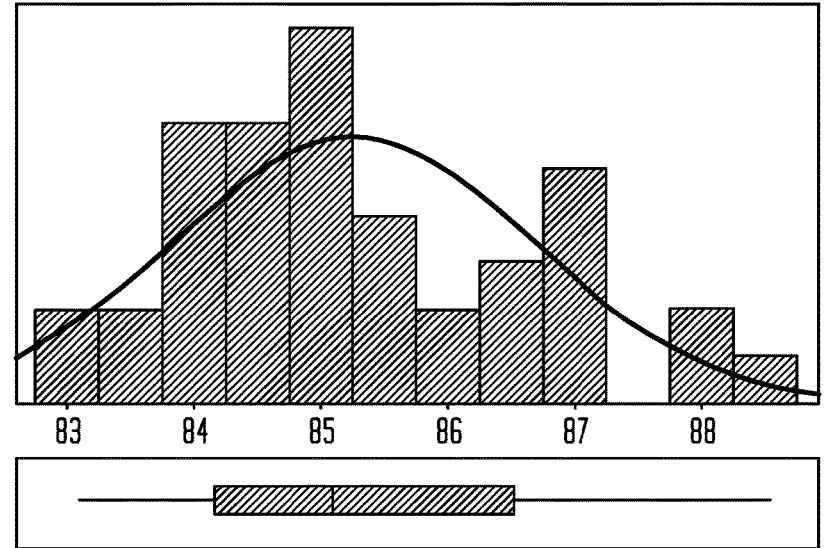
FIG. 5 is a histogram illustrating an RV distribution of a polymer having a nominal RV of 85 made by an SSP process utilizing the apparatus of FIG. 2.

Product quality is also reflected, in part, by the RV Standard Deviation which unexpectedly correlates closely with the processability of the polyamide into fiber, film and molded parts as is seen in the examples which follow. Nylon 6,6 with an RV of 85 made by way of the process and apparatus of FIG. 1 had an RV Standard Deviation of 0.83, while Nylon 6,6 with an RV of 85 made by way of the process and apparatus of FIG. 2 had an RV Standard Deviation of 1.4, about a 75% higher level of variability. Details on the RV distributions of the products appear in FIGS. 4, 5.

Example 1

Continuous Polycondensation of PA66 (Also Known as N66)

Continuous polycondensation of PA66 was carried out starting with utilizing the apparatus of FIG. 1, concentrating the AH-salt solution at a pressure of 2 bar to approximately 85% solids. This hot salt solution is then fed into the polycondensation reactor that is jacket heated in three stages from 204 to 270° C., with the solution temperature increasing to 230° C. with a pressure of 18.5 bar. The precondensate is removed from the sump of the reactor end by an extrusion pump and pressed onto a decompressor/flasher that has been heated to 290° C., with a final pressure of only 1 bar. The prepolymerisate then flows through a phase separator followed by a finisher, so that the last remaining traces of water evaporate and the precondensate takes the temperature of 275° C. The extrusion pump presses the material through the polymer pipe to the twin screw extruder with barrel zone temperature set at 275° C. The temperature is raised to and held for approximately 20-30 seconds at 350° C. The extruder has two vacuum vents operating at 28" Hg vacuum. The exiting polymer is pumped through a strand die and pelletized.

The Nylon 66 product polymer typically had a precision RV of greater than 50 with a RV Standard Deviation of less than or equal to 1.25, a Gel Content Parameter of less than 50 ppm as determined by parts per million insolubles larger than 10 microns in 90% formic acid at 25° C.; and an Average Optical Defect Level of less than 2,000 parts per million (ppm) as measured by optical scanning of pellets.

Examples 2-5

Devolatilization experiments were carried out using a W/P (Werner and Pfleiderer) 40 mm twin screw extruder of the class shown in FIG. 1. The L/D of the extruder was 56 and the extruder had 14 barrels. The screw was designed with a melting section and two devolatilization zones. Vacuum vents (vent stuffers) were provided to the extruder. Each of the vent stuffers was connected to a liquid ring vacuum pump which was operated to maintain a predetermined vacuum at these vents. The screws were designed to produce melt seals upstream of each vacuum vent. A feeder was used to precisely feed polymer pellets. A five-hole die (diameter 4 mm) was mounted at the end of the extruder. Experiments were performed at 125 to 200 lbs/hr. and between 300 and 500 rpm screw speeds. The processing temperature was between 265 and 350° C. The strands were cooled using a 5' water bath and pelletized with a strand pelletizer. A hand-held electronic temperature probe from EDL was used to measure the melt temperature at the exit of the die.

Viscosity measurements (RV) were performed in formic acid. Residence time was measured using colored pellets.

Details and results appear in the table immediately below.

Example 9

For purposes of comparison, Nylon 66 polymer was prepared by feeding low molecular weight Nylon 66 polymer flake to an SSP column as shown and described in connection with FIG. 2 and solid state polymerized such that the final product had an RV of 85.

Examples 10-13

In these examples high tenacity Nylon 66 multifilament yarn suitable for tire cord was spun from polymer made in accordance with the reactive extrusion process generally described in Examples 1-8. Nylon 66 polymer in flake form containing 150 ppm Benzene Phosphinic acid, 70 ppm copper in the form of copper bromide and Potassium in the form of potassium bromide and potassium iodide and having a RV of about 85 and balanced amine and carboxyl end groups is melt-spun in a conventional manner to provide an as-spun multifilament yarn. Nylon 66 polymer in flake form with the present invention described in Examples 2-8 was fed from a separate silo onto an extruder followed by a quench zone and draw zone. Draw ratio is determined by the ratio of the highest and lowest roll speeds. Results are

| | | | Devolatilization using twin screw extruder only: | | | | | |
|---|---|---|---|---|---|---|---|---|
| Example | Feed Rate (PPH) | RPM | Residence Time in the extruder | Melt Temperature (° C.) | Feed RV | Final RV | RV Standard Deviation | Average Optical Defect Level |
| 2 | 125 | 450 | 32 s | 350 | 42 | 89 | 1.41 | 1670 |
| 3 | 150 | 450 | 30 s | 340 | 42 | 80 | 2.12 | 1600 |
| 4 | 175 | 450 | 28 s | 330 | 42 | 75 | 0.35 | 1440 |
| 5 | 200 | 450 | 24 s | 322 | 42 | 66 | 1.90 | 1358 |

Examples 6-8

Following the procedure of Examples 2-5, a residence time (RT) block (residence time dwell vessel) was attached at the end of the extruder. The pelletizing die was mounted at the end of the RT block. The diameter of the RTB pipe was 2.2" and it was 3' long. Low pressure drop (LPD) static mixers from Ross Engineering were inserted into this RTB pipe. The main objective of this RTB block is to make high RV polymers at lower melt temperature. The higher temperature makes higher gels, black specks. It can be seen from Examples 6,7 that the melt temperature is higher at lower rate and same rpm. The higher melt temperature not only increases the RV it also makes higher degradation products.

A sufficient reaction time was allowed inside the residence time block (RTB) to reach the RV at equilibrium moisture content.

Details and results appear in the table immediately below.

compared with an SSP process where the Nylon 66 polymer in flake form produced from a continuous polymerization line followed by solid state polymerization column in order to increase the RV of the polymer to 85 (Example 9). The spinning performance of the polymer flake from each method is determined by the stress test where draw ratio is increased step by step and average broken filament number for each step is recorded using online broken filament detectors. Bobbins were collected from each draw ratio and the physical properties of obtained yarn was tested. The quality of the yarn is determined by number of average of broken filament count during spinning when the yarn is drawn to an extent to achieve 9.5 g/den. The results in the Table below show that as-spun yarn which is produced from the Nylon 66 flake from the process generally described in Examples 1-8 is capable of obtaining 9.5 g/den tenacity at lower average broken filament count per minute. The amount of gel that were not soluble in formic acid is also

| | | | Devolatilization using twin screw extruder and RTB | | | | | | |
|---|---|---|---|---|---|---|---|---|---|
| Example | Feed Rate (PPH) | RPM | Residence time (Total) Extruder + RTB | Melt Temp. (° C.) | Feed RV | Final RV | RV Standard Deviation | Gel Content Parameter | Average Optical Defect Level |
| 6 | 125 | 450 | 112 s | 315 | 42 | 88 | 1.17 | 16.4 | 1792 |
| 7 | 150 | 450 | 100 s | 310 | 42 | 83 | 0.77 | 12.6 | 1360 |
| 8 | 150 | 450 | 98 s | 318 | 46* | 95 | 1.77 | 15.3 | 1920 |

*The polymer had a different composition reported. Polymer from the reactive vacuum extrusion process shows less insolubles than polymer produced from continuous polymerization followed by SSP process.

Details and results appear in the table immediately below.

| Example | Process | Polymer RV | Average BFC/min at 9.5 g/den | Gel Content Parameter (ppm) | RV Standard Deviation | Average Optical Defect Level (ppm) |
|---|---|---|---|---|---|---|
| 10 | SSP | 85 | 0.95 | 11.6 | 1.6 | 187 |
| 11 | SSP | 85 | 0.81 | 10.6 | 1.3 | 272 |
| 12 | Reactive Vacuum Extrusion | 85 | 0.35 | 8.4 | 0.6 | 1472 |
| 13 | Reactive Vacuum Extrusion | 85 | 0.07 | 9.7 | 0.7 | 704 |

The SSP material was superior in terms of optical defect levels; but exhibited more filament breakage. Without intending to be bound by any theory, it is believed the spinning performance correlates more strongly with gel content and/or RV standard deviation than optical defect levels.

Multifilament nylon yarns and their use in tire cord are discussed at some length in U.S. Pat. Nos. 7,159,381, 4,720,943 and 4,416,935.

LISTING OF PREFERRED EMBODIMENTS OF THE INVENTION

There is thus provided in a First Polyamide Polymer Embodiment of the present invention a high molecular weight polyamide polymer, wherein the polyamide polymer is characterized by a precision Relative Viscosity greater than 50 as measured in a 90% strength formic acid solution, wherein the precision Relative Viscosity has an RV Standard Deviation of less than or equal to 1.25.

A Second Polyamide Polymer Embodiment is provided in the form of a high molecular weight polyamide polymer, wherein the polyamide polymer is characterized by:
  a Relative Viscosity greater than 50 as measured in a 90% strength formic acid solution;
  a Gel Content Parameter of less than 50 ppm as determined by parts per million insolubles larger than 10 microns in 90% formic acid at 25° C.; and
  an Average Optical Defect Level of less than 2,000 parts per million (ppm) as measured by optical scanning of pellets.

A Third Polyamide Polymer Embodiment is provided in the form of a high molecular weight polyamide polymer, wherein the polyamide polymer is characterized by:
  a Relative Viscosity greater than 50 as measured in a 90% strength formic acid solution; and
  a Gel Content Parameter of less than 50 ppm as determined by parts per million insolubles larger than 10 microns in 90% formic acid at 25° C.

Still yet a Fourth Polyamide Polymer Embodiment of the present invention is provided in the form of a high molecular weight polyamide polymer, wherein the polyamide polymer is characterized by:
  a precision Relative Viscosity greater than 50 as measured in a 90% strength formic acid solution, wherein the precision Relative Viscosity has an RV Standard Deviation of less than or equal to 1.25;

a Gel Content Parameter of less than 50 ppm as determined by parts per million insolubles larger than 10 microns in 90% formic acid at 25° C.; and
  an Average Optical Defect Level of less than 2,000 parts per million (ppm) as measured by optical scanning of pellets.

Additional embodiments include the following:

Polyamide Polymer Embodiment No. 5 is the polyamide polymer of any of Polyamide Polymer Embodiments 1 through 4, wherein the polymer is Nylon 6,6 polymer.

Polyamide Polymer Embodiment No. 6 is the polyamide polymer of any of Polyamide Polymer Embodiments 1 through 4, wherein the polymer is Nylon 6 polymer.

Polyamide Polymer Embodiment No. 7 is the polyamide polymer of any of Polyamide Polymer Embodiments 1 through 4 wherein the polymer is a random copolymer of Nylon 6,6 and Nylon 6.

Polyamide Polymer Embodiment No. 8 is the polyamide polymer of any of the foregoing Polyamide Polymer Embodiments, wherein the Relative Viscosity is greater than 70 as measured in a 90% strength formic acid solution.

Polyamide Polymer Embodiment No. 9 is the polyamide polymer of any of the foregoing Polyamide Polymer Embodiments, wherein the Relative Viscosity is greater than 90 as measured in a 90% strength formic acid solution.

Polyamide Polymer Embodiment No. 10 is the polyamide polymer of any of the foregoing Polyamide Polymer Embodiments, wherein the Relative Viscosity is in the range of from 50 to 200 as measured in a 90% strength formic acid solution.

Polyamide Polymer Embodiment No. 11 is the polyamide polymer of any of the foregoing Polyamide Polymer Embodiments, wherein the Relative Viscosity is in the range of from 75 to 100 as measured in a 90% strength formic acid solution.

Polyamide Polymer Embodiment No. 12 is the polyamide polymer of any of the foregoing Polyamide Polymer Embodiments, wherein the Relative Viscosity is in the range of from 80 to 97.5 as measured in a 90% strength formic acid solution.

Embodiment No. 13 is the polyamide polymer of any of the foregoing Polyamide Polymer Embodiments, wherein the precision Relative Viscosity has an RV Standard Deviation of less than 1.0.

Polyamide Polymer Embodiment No. 14 is the polyamide polymer of any of the foregoing Polyamide Polymer Embodiments, wherein the precision Relative Viscosity has an RV Standard Deviation of less than 0.9.

Polyamide Polymer Embodiment No. 15 is the polyamide polymer of any of the foregoing Polyamide Polymer Embodiments, wherein the precision Relative Viscosity has an RV Standard Deviation of from 0.5 to 1.25.

Polyamide Polymer Embodiment No. 16 is the polyamide polymer of any of Polyamide Polymer Embodiments Nos. 1-5 and 8-15, wherein the polymer is a Nylon 6,6 polymer made into a multifilament yarn having the following characteristics: tenacity greater than 9.0 g/d; elongation greater than 18%, and broken filaments less than 2 per 20 lb bobbin.

Polyamide Polymer Embodiment No. 17 is the polyamide polymer of Polyamide Polymer Embodiment No. 16, made into a multifilament yarn having the following characteristics: tenacity greater than 9.0 g/d; elongation greater than 18%, and broken filaments less than 1 or less than 0.5 broken filaments per 20 lb bobbin.

Polyamide Polymer Embodiment No. 18 is the Nylon 6,6 multifilament yarn according to Polyamide Polymer Embodiment Nos. 16 or 17, wherein the yarn is incorporated into 1 or more of: tires, airbags, seatbelts and industrial fabrics.

Polyamide Polymer Embodiment No. 19 is the polyamide polymer of any Polyamide Polymer Embodiment Nos. 1-5 and 8-18, wherein further the polyamide is a Nylon 6,6 polymer which exhibits a Gel Content Parameter of less than 40 ppm as determined by parts per million insoluble larger than 10 microns in 90% formic acid at 25° C.

Polyamide Polymer Embodiment No. 20 is the polyamide polymer of Polyamide Polymer Embodiment No. 19, wherein further the Nylon 6,6 polymer exhibits a Gel Content Parameter of less than 25 ppm as determined by parts per million insoluble larger than 10 microns in 90% formic acid at 25° C.

Polyamide Polymer Embodiment No. 21 is the polyamide polymer of Polyamide Polymer Embodiment No. 19, wherein further the Nylon 6,6 polymer exhibits a Gel Content Parameter of from 1 ppm to less than 10 ppm as determined by parts per million insoluble larger than 10 microns in 90% formic acid at 25° C.

Polyamide Polymer Embodiment No. 22 is the polyamide polymer of Polyamide Polymer Embodiment No. 19, wherein further the Nylon 6,6 polymer exhibits a Gel Content Parameter of less than 10 ppm as determined by parts per million insoluble larger than 10 microns in 90% formic acid at 25° C.

Polyamide Polymer Embodiment No. 23 is the polyamide polymer of any of Polyamide Polymer Embodiments Nos. 1-5 and 8-22, wherein further the polyamide is as Nylon 6,6 polymer which exhibits an Average Optical Defect Level of no greater than 1000 parts per million (ppm).

Polyamide Polymer Embodiment No. 24 is the polyamide polymer of Polyamide Polymer Embodiment No. 23, wherein further the Nylon 6,6 polymer exhibits an Average Optical Defect Level of no greater than 500 parts per million (ppm).

Further aspects of the invention include processes for making high molecular weight polyamides having any of the features of Polyamide Polymer Embodiments 1 through 24 noted above.

There is provided in a first Process Embodiment of the present invention a method of making a high molecular weight polyamide polymer with a precision Relative Viscosity and low gel content comprising:

(a) providing a first polyamide polymer melt comprising a first polyamide polymer with a first Relative Viscosity;

(b) feeding the first polyamide polymer melt to a twin screw extruder; and (c) melt-processing the first polyamide polymer melt under vacuum in the twin screw extruder to remove steam and other volatiles therefrom, thereby increasing the molecular weight of the polymer melt to provide a second polyamide polymer melt comprising a second polyamide polymer with a second Relative Viscosity, said second polyamide polymer being characterized by either: (i) a precision Relative Viscosity greater than 50 as measured in a 90% strength formic acid solution with an RV Standard Deviation of less than or equal to 1.25; or (ii) a Gel Content Parameter of less than 50 ppm as determined by parts per million insoluble larger than 10 microns in a 90% formic acid solution at 25° C. and an Average Optical Defect level of less than 2000 ppm as measured by optical scanning at 50 micron resolution;

(d) optionally feeding the second polymer melt to a residence time dwell vessel and melt-processing the second polymer melt in the residence time dwell vessel to provide a third polyamide polymer melt comprising a third polyamide polymer with a third Relative Viscosity higher than the second Relative Viscosity of the second polyamide polymer, said third polyamide polymer being characterized by either: (i) a precision Relative Viscosity greater than 50 as measured in a 90% strength formic acid solution with an RV Standard Deviation of less than or equal to 1.25; or (ii) a Gel Content Parameter of less than 50 ppm as determined by parts per million insoluble larger than 10 microns in a 90% formic acid solution at 25° C. and an Average Optical Defect level of less than 2000 ppm as measured by optical scanning at 50 micron resolution; and (e) recovering a product polyamide polymer characterized by either: (i) a precision Relative Viscosity greater than 50 as measured in a 90% strength formic acid solution with an RV Standard Deviation of less than or equal to 1.25; or (ii) a Gel Content Parameter of less than 50 ppm as determined by parts per million insoluble larger than 10 microns in a 90% formic acid solution at 25° C. and an Average Optical Defect level of less than 2000 ppm as measured by optical scanning at 50 micron resolution.

Process Embodiment No. 2 is the method of making a high molecular weight polyamide polymer with a precision Relative Viscosity and a low gel content according to Process Embodiment No. 1, wherein the polyamide polymer melt is melt-processed in the twin screw extruder at a temperature in the range of from 280° C. to 350° C.

Process Embodiment No. 3 is the method of making a high molecular weight polyamide polymer with a precision Relative Viscosity and a low gel content according to Process Embodiment No. 1, wherein the polyamide polymer melt is melt-processed in the twin screw extruder at a temperature in the range of from 285° C. to 305° C.

Process Embodiment No. 4 is the method of making a high molecular weight polyamide polymer with a precision Relative Viscosity and a low gel content according to any of the foregoing Process Embodiments, wherein the polyamide polymer melt is melt-processed in the twin screw extruder under vacuum in the range of 600 mm Hg vacuum to 725 mm Hg vacuum.

Process Embodiment No. 5 is the method of making a high molecular weight polyamide polymer with a precision Relative Viscosity and a low gel content according to any of the foregoing Process Embodiments, wherein the polyamide polymer melt is melt-processed in the twin screw extruder under vacuum in the range of from 650 mm Hg vacuum to 725 mm Hg vacuum.

Process Embodiment No. 6 is the method of making a high molecular weight polyamide polymer with a precision Relative Viscosity and a low gel content according to any of the foregoing Process Embodiments, wherein the polyamide polymer melt is melt-processed in the twin screw extruder for a residence time in the extruder of less than 60 seconds.

Process Embodiment No. 7 is the method of making a high molecular weight polyamide polymer with a precision Relative Viscosity and a low gel content according to any of the foregoing Process Embodiments, wherein the polyamide polymer melt is melt-processed in the twin screw extruder for a residence time in the extruder of less than 30 seconds.

Process Embodiment No. 8 is the method of making a high molecular weight polyamide polymer with a precision Relative Viscosity and a low gel content according to any of the foregoing Process Embodiments, wherein the polyamide polymer melt is melt-processed in the twin screw extruder for a residence time in the extruder of less than 20 seconds.

Process Embodiment No. 9 is the method of making a high molecular weight polyamide polymer with a precision Relative Viscosity and a low gel content according to any of the foregoing Process Embodiments, wherein the polyamide polymer melt is melt-processed in the twin screw extruder for a residence time in the extruder of from 10 seconds to 60 seconds.

Process Embodiment No. 10 is the method of making a high molecular weight polyamide polymer with a precision Relative Viscosity and a low gel content according to any of the foregoing Process Embodiments, comprising feeding the second polymer melt to a residence time dwell vessel and melt-processing the second polymer melt in the residence time dwell vessel to provide the third polyamide polymer melt comprising a third polyamide polymer with a third Relative Viscosity higher than the second Relative Viscosity of the second polyamide polymer, said third polyamide polymer being characterized by either: (i) a precision Relative Viscosity greater than 50 as measured in a 90% strength formic acid solution with an RV Standard Deviation of less than or equal to 1.25; or (ii) a Gel Content Parameter of less than 50 ppm as determined by parts per million insoluble larger than 10 microns in a 90% formic acid solution at 25° C. and an Average Optical Defect level of less than 2000 ppm as measured by optical scanning at 50 micron resolution.

Process Embodiment No. 11 is the method of making a high molecular weight polyamide polymer with a precision Relative Viscosity and a low gel content according to Process Embodiment No. 10, wherein the polyamide polymer melt is melt-processed in the residence time dwell vessel at a temperature in the range of from 280° C. to 350° C.

Process Embodiment No. 12 is the method of making a high molecular weight polyamide polymer with a precision Relative Viscosity and a low gel content according to Process Embodiment No. 10, wherein the polyamide polymer melt is melt-processed in the residence time dwell vessel at a temperature in the range of from 285° C. to 305° C.

Process Embodiment No. 13 is the method of making a high molecular weight polyamide polymer with a precision Relative Viscosity and a low gel content according to Process Embodiment Nos. 10, 11 or 12, wherein the polyamide polymer melt is melt-processed in the residence time dwell vessel for a residence time in the residence time dwell vessel of from 30 seconds to 5 minutes.

Process Embodiment No. 14 is the method of making a high molecular weight polyamide polymer with a precision Relative Viscosity and a low gel content according to Process Embodiment Nos. 10, 11, 12 or 13, wherein the polyamide polymer melt is melt-processed in the residence time dwell vessel for a residence time in the residence time dwell vessel of at least 1 minute.

Process Embodiment No. 15 is the method of making a high molecular weight polyamide polymer with a precision Relative Viscosity and a low gel content according to Process Embodiment Nos. 10, 11, 12, 13 or 14, wherein the polyamide polymer melt is melt-processed in the residence time dwell vessel for a residence time in the residence time dwell vessel of from 1.5 to 3 minutes. The product polyamide product recovered from any of Process Embodiments 1 through 15 may have any or all of the features and combinations recited above in connection with the Polyamide Polymer Embodiment Nos. 1 through 24.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the description of the related art and detailed description of embodiments, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

The invention claimed is:

1. A method of making a high molecular weight Nylon 6,6 polyamide polymer, the method comprising:
   (a) feeding a concentrated nylon salt solution into a polycondensation reactor that heats the concentrated nylon salt solution over three stages to a temperature of about 230° C. and a pressure of about 18.5 bar, thereby to yield a first Nylon 6,6 polyamide polymer melt comprising a first Nylon 6,6 polyamide polymer with a first Relative Viscosity;
   (b) feeding the first Nylon 6,6 polyamide polymer melt into a flasher that heats and decompresses the first Nylon 6,6 polyamide polymer melt to a final pressure of about 1 bar, thereby to yield a decompressed first Nylon 6,6 polyamide polymer melt;
   (c) feeding the decompressed first Nylon 6,6 polyamide polymer melt to a finishing vessel that heats the decompressed first Nylon 6,6 polyamide polymer melt under a blanket of inert gas to further polymerize and remove moisture from the decompressed first Nylon 6,6 polyamide polymer melt, thereby to yield a decompressed second Nylon 6,6 polyamide polymer melt comprising a second Nylon 6,6 polyamide polymer with a second Relative Viscosity;
   (d) feeding the decompressed second Nylon 6,6 polyamide polymer melt to a twin screw extruder that melt-processes the decompressed second Nylon 6,6 polyamide polymer melt under vacuum in the twin screw extruder in the absence of added steam or gas to remove moisture and other volatiles therefrom and to increase a molecular weight of the decompressed second Nylon 6,6 polyamide polymer melt, for a residence time in the twin screw extruder of less than 60-seconds, thereby to yield a third Nylon 6,6 polyamide polymer melt comprising a third Nylon 6,6 polyamide polymer with a third Relative Viscosity; and
   (e) recovering a product Nylon 6,6 polyamide polymer, wherein the product Nylon 6,6 polyamide polymer is characterized by a precision Relative Viscosity greater than 60 as measured in a 90% strength formic acid solution, and wherein the precision Relative Viscosity has an RV Standard Deviation of less than or equal to 1.0 and a Gel content Parameter of less than 10 ppm as determined by parts per million insolubles larger than 10 microns in 90% formic acid at 25° C.

2. The method of making a high molecular weight Nylon 6,6 polyamide polymer according to claim 1, wherein the decompressed second Nylon 6,6 polyamide polymer melt is melt processed in the twin screw extruder at a temperature ranging from 280° C. to 350° C. under vacuum ranging from 600 mm Hg vacuum to 725 mm Hg vacuum, and wherein the residence time in the twin screw extruder ranges from 10 seconds to less than 30 seconds.

3. The method of making a high molecular weight Nylon 6,6 polyamide polymer according to claim 1, wherein, after step (d) and prior to step (e), the method comprises feeding the third Nylon 6,6 polymer melt to a residence time dwell vessel and melt-processing the third Nylon 6,6 polymer melt with mixing in the residence time dwell vessel at a temperature ranging from 280° C. to 350° C. for a residence time in the residence time dwell vessel of at least 1 minute, thereby to yield a fourth Nylon 6,6 polyamide polymer melt comprising a fourth Nylon 6,6 polyamide polymer with a fourth Relative Viscosity higher than the third Relative Viscosity of the third Nylon 6,6 polyamide polymer.

4. The method of making a high molecular weight Nylon 6,6 polyamide polymer according to claim 1, wherein the precision Relative Viscosity of the product Nylon 6,6 polyamide polymer is 85, as measured in a 90% strength formic acid solution, and wherein the product Nylon 6,6 polyamide polymer contains balanced amine and carboxyl groups.

5. The method of making a high molecular weight Nylon 6,6 polyamide polymer according to claim 1, wherein, prior to step (a), the method comprises:
   concentrating a nylon salt solution at a pressure of about 2 bar, thereby to yield the concentrated nylon salt solution containing approximately 85% solids.

6. The method of making a high molecular weight Nylon 6,6 polyamide polymer according to claim 1, wherein the polycondensation reactor comprises a plug flow reactor.

7. The method of making a high molecular weight Nylon 6,6 polyamide polymer according to claim 1, wherein the first Relative Viscosity is from 3 to 20, the second Relative Viscosity is from 30 to 45, and the third Relative Viscosity is greater than or equal to 75, as measured in a 90% strength formic acid solution.

8. The method of making a high molecular weight Nylon 6,6 polyamide polymer according to claim 1, comprising:
   (f) melt-spinning the product Nylon 6,6 polyamide polymer, thereby to yield a multifilament Nylon 6,6 polyamide yarn.

9. The method of making a high molecular weight Nylon 6,6 polyamide polymer according to claim 1, wherein, prior to step (c), the method comprises feeding the decompressed first Nylon 6,6 polyamide polymer melt to a phase separator that removes volatiles from the decompressed first Nylon 6,6 polyamide polymer melt.

10. A method of making a high molecular weight polyamide polymer with a precision Relative Viscosity and low gel content, the method comprising:
   (a) forming and concentrating a nylon salt solution;
   (b) heating the concentrated nylon salt solution in a polycondensation reactor provided with a flasher, thereby to yield a decompressed first polyamide polymer melt maintained at a pressure of about 1 bar, the decompressed first polyamide polymer comprising a first polyamide polymer with a first Relative Viscosity;
   (c) feeding the decompressed first polyamide polymer melt to a finishing vessel that heats the decompressed first polyamide polymer melt under a blanket of inert gas to further polymerize and remove moisture from the decompressed first polyamide polymer melt, thereby to yield a decompressed second polyamide polymer melt comprising a second polyamide polymer with a second Relative Viscosity;

(d) feeding the decompressed second polyamide polymer melt to a twin screw extruder to melt process the decompressed second polyamide polymer melt under vacuum in the twin screw extruder in the absence of added steam or gas to remove moisture and other volatiles therefrom and to increase a molecular weight of the decompressed second polyamide polymer melt, for a residence time in the twin screw extruder of less than 60 seconds, thereby to yield a third polyamide polymer melt comprising a third polyamide polymer with a third Relative Viscosity, the third polyamide polymer being characterized by either:
      (i) a precision Relative Viscosity greater than 50 as measured in a 90% strength formic acid solution with an RV Standard Deviation of less than or equal to 1.25; or
      (ii) a Gel Content Parameter of less than 50 ppm as determined by parts per million insoluble larger than 10 microns in a 90% formic acid solution at 25° C.; and
   (e) recovering a product polyamide polymer characterized by either: (i) a precision Relative Viscosity greater than 50 as measured in a 90% strength formic acid solution with an RV Standard Deviation of less than or equal to 1.25; or (ii) a Gel Content Parameter of less than 50 ppm as determined by parts per million insoluble larger than 10 microns in a 90% formic acid solution at 25° C. and an Average Optical Defect level of less than 2000 ppm as measured by optical scanning at 50 micron resolution.

11. The method of making a high molecular weight polyamide polymer with a precision Relative Viscosity and a low gel content according to claim 10, wherein the decompressed second polyamide polymer melt is melt-processed in the twin screw extruder at a temperature ranging from 280° C. to 350° C.

12. The method of making a high molecular weight polyamide polymer with a precision Relative Viscosity and a low gel content according to claim 10, wherein the decompressed second polyamide polymer melt is melt-processed in the twin screw extruder under vacuum ranging from 600 mm Hg vacuum to 725 mm Hg vacuum.

13. The method of making a high molecular weight polyamide polymer with a precision Relative Viscosity and a low gel content according to claim 10, wherein the residence time of the decompressed second polyamide polymer melt in the twin screw extruder is less than 20 seconds.

14. The method of making a high molecular weight polyamide polymer with a precision Relative Viscosity and a low gel content according to claim 10, wherein the residence time of the decompressed second polyamide polymer melt in the twin screw extruder ranges from 10 seconds to 60 seconds.

15. The method of making a high molecular weight polyamide polymer with a precision Relative Viscosity and a low gel content according to claim 10, wherein, after step (c) and prior to step (d), the method comprises feeding the third polyamide polymer melt to a residence time dwell vessel having low pressure drop (LPD) static mixers included therein and melt-processing the third polyamide polymer melt with mixing in the residence time dwell vessel to provide a fourth polyamide polymer melt comprising a fourth polyamide polymer with a fourth Relative Viscosity higher than the third Relative Viscosity of the second polyamide polymer, the fourth polyamide polymer being characterized by either:

(i) a precision Relative Viscosity greater than 50 as measured in a 90% strength formic acid solution with an RV Standard Deviation of less than or equal to 1.25; or (ii) a Gel Content Parameter of less than 50 ppm as determined by parts per million insoluble larger than 10 microns in a 90% formic acid solution at 25° C. and an Average Optical Defect level of less than 2000 ppm as measured by optical scanning at 50 micron resolution.

16. The method of making a high molecular weight polyamide polymer with a precision Relative Viscosity and a low gel content according to claim 15, wherein the third polyamide polymer melt is melt-processed in the residence time dwell vessel at a temperature ranging from 280° C. to 350° C.

17. The method of making a high molecular weight polyamide polymer with a precision Relative Viscosity and a low gel content according to claim 15, wherein the third polyamide polymer melt is melt-processed in the residence time dwell vessel for a residence time in the residence time dwell vessel of at least 1 minute.

18. The method of making a high molecular weight polyamide polymer with a precision Relative Viscosity and a low gel content according to claim 10, comprising:

(f) melt-spinning the product polyamide polymer, thereby to yield a multifilament polyamide yarn.

* * * * *